United States Patent [19]

Barsness et al.

[11] Patent Number: 5,805,898
[45] Date of Patent: Sep. 8, 1998

[54] METHOD AND APPARATUS FOR ESTIMATING INSTALLATION TIME IN A DATA PROCESSING SYSTEM

[75] Inventors: Eric Lawrence Barsness, Pine Island; Richard Fred Harwood, Lakeville; Jennifer Anne Larson, Rochester, all of Minn.

[73] Assignee: International Business Machines Corporation, Armonk, N.Y.

[21] Appl. No.: 393,755

[22] Filed: Feb. 24, 1995

[51] Int. Cl.⁶ .................................................. G06F 9/06
[52] U.S. Cl. ............................................. 395/712; 395/652
[58] Field of Search ................................ 395/700, 712, 395/651, 652, 653

[56] References Cited

U.S. PATENT DOCUMENTS

| | | | |
|---|---|---|---|
| 5,117,324 | 5/1992 | Johnson, Jr | 361/66 |
| 5,155,837 | 10/1992 | Liu et al. | 395/500 |
| 5,230,059 | 7/1993 | Nielsen et al. | 395/800 |
| 5,247,683 | 9/1993 | Holmes et al. | 395/700 |
| 5,303,166 | 4/1994 | Amalfitano et al. | 364/551.01 |
| 5,325,505 | 6/1994 | Hoffecker | 395/425 |
| 5,367,686 | 11/1994 | Fisher et al. | 395/712 |
| 5,421,009 | 5/1995 | Platt | 395/712 |
| 5,495,610 | 2/1996 | Shing et al. | 395/610 |

FOREIGN PATENT DOCUMENTS

| | | | |
|---|---|---|---|
| 515136A3 | 11/1992 | European Pat. Off. | G06F 11/34 |

OTHER PUBLICATIONS

(No Author Given) "Paradox Relational Database Version 3.5, Introduction to Paradox", Borland International, 1990, pp. 22–26.

*Primary Examiner*—Kevin A. Kriess
*Attorney, Agent, or Firm*—Andrew J. Dillon

[57] ABSTRACT

A method and apparatus for estimating the time needed to install software. Configuration information about the data processing system is obtained, as well as information about data needing conversion that is stored on the system. The stand-alone installation time for each portion of the software to be installed is determined and a menu of the installation options is displayed for selection. In response to the selection of options, a determination of whether the installation will be non-linear is made. Non-linear installation involves the ability to install several portions of the software simultaneously, such as in, for example, multiprocessing, multithreading, or parallel processing. In response to a presence of non-linear processing, installation time is determined for the selected options and displayed to the user.

15 Claims, 10 Drawing Sheets

```
┌─────────────────────────────────────────────────────┐  ⌐500
│  Select options to be installed                     │
│                                    Stand-alone      │
│    OPTION                          Time (minutes)   │
│    Base code                           20.0         │
│    Network support                      4.0         │
│    Multimedia support                   8.0         │
│    Database                            16.0         │
│    Printer support                      5.0   ⌐502  │
│  Total Multiprocess Installation Time  [    ] minutes│
│   ┌───────┐⌐504    ┌──────┐⌐506      ┌────┐⌐508    │
│   │Install│        │Cancel│          │Help│         │
│   └───────┘        └──────┘          └────┘         │
└─────────────────────────────────────────────────────┘
```

Fig. 5B

```
┌─────────────────────────────────────────────────────┐  ⌐500
│  Select options to be installed                     │
│                                    Stand-alone      │
│    OPTION                          Time (minutes)   │
│    ////Base code////////////////////////20.0///     │
│    Network support                      4.0         │
│    Multimedia support                   8.0         │
│    Database                            16.0         │
│    Printer support                      5.0   ⌐502  │
│  Total Multiprocess Installation Time  [20.0] minutes│
│   ┌───────┐⌐504    ┌──────┐⌐506      ┌────┐⌐508    │
│   │Install│        │Cancel│          │Help│         │
│   └───────┘        └──────┘          └────┘         │
└─────────────────────────────────────────────────────┘
```

METHOD AND APPARATUS FOR ESTIMATING INSTALLATION TIME IN A DATA PROCESSING SYSTEM

BACKGROUND OF THE INVENTION

1. Technical Field

The present invention relates to an improved data processing system and in particular to a method and system for estimating software installation time in a data processing system. Still more particularly, the present invention relates to an improved method and system for estimating software installation time on data processing systems that utilize multiprocessing or multithreading.

2. Description of the Related Art

Installation of new software and new releases of software can be a very complex process. The installation may require a number of different disks, magnetic tape media, or CD-ROMs. In addition, different configurations for different data processing systems make the time required to complete an installation of software very hard to predict. Such a problem is greatly magnified when installing new software or new releases of software in a network because work stations within the network often have different configurations. Installation of new software often provides a user various options that may or may not be installed depending on the user's selection. The new software may include various programs as options that may or may not be installed. For example, the base code or base program of the software is typically always installed. Other programs, such as a tutorial program or a help program, may be optional when installing the new software. In addition, often times, existing files will be modified or converted when installing new software or a new revisions of the software. Currently, many methods for estimating software installation time provide estimates for selected hardware configurations and may be very inaccurate. In addition, estimations provided with installation software often take in account only stand-alone time for installation. As a result, installation times can and do very greatly from user expectations, resulting in dissatisfaction.

As a result, it would be advantageous to have an improved method and apparatus for estimating software installation times.

SUMMARY OF THE INVENTION

It is therefore one object of the present invention to provide an improved data processing system.

It is another object of the present invention to provide a method and system for improving the prediction of software installation time in a data processing system.

It is yet another object of the present invention to provide a method and system for improving the prediction of software installation time on data processing systems that utilize multiprocessing or multithreading.

The present invention provides a method and apparatus for estimating the time needed to install software. Configuration information about the data processing system is obtained, as well as information about data needing conversion that is stored on the system. The stand-alone installation time for each portion of the software to be installed is determined and a menu of the installation options is displayed for selection. A stand-alone installation occurs when only one option is installed and only one thread or processor is employed. In response to the selection of options, a determination of whether the installation will be non-linear is made. Non-linear installation involves the ability to install several portions of the software simultaneously, such as, for example, multiprocessing, multithreading, or parallel processing in a data processing system. In response to a presence of non-linear processing, installation time is determined for the selected options or programs and displayed to the user.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
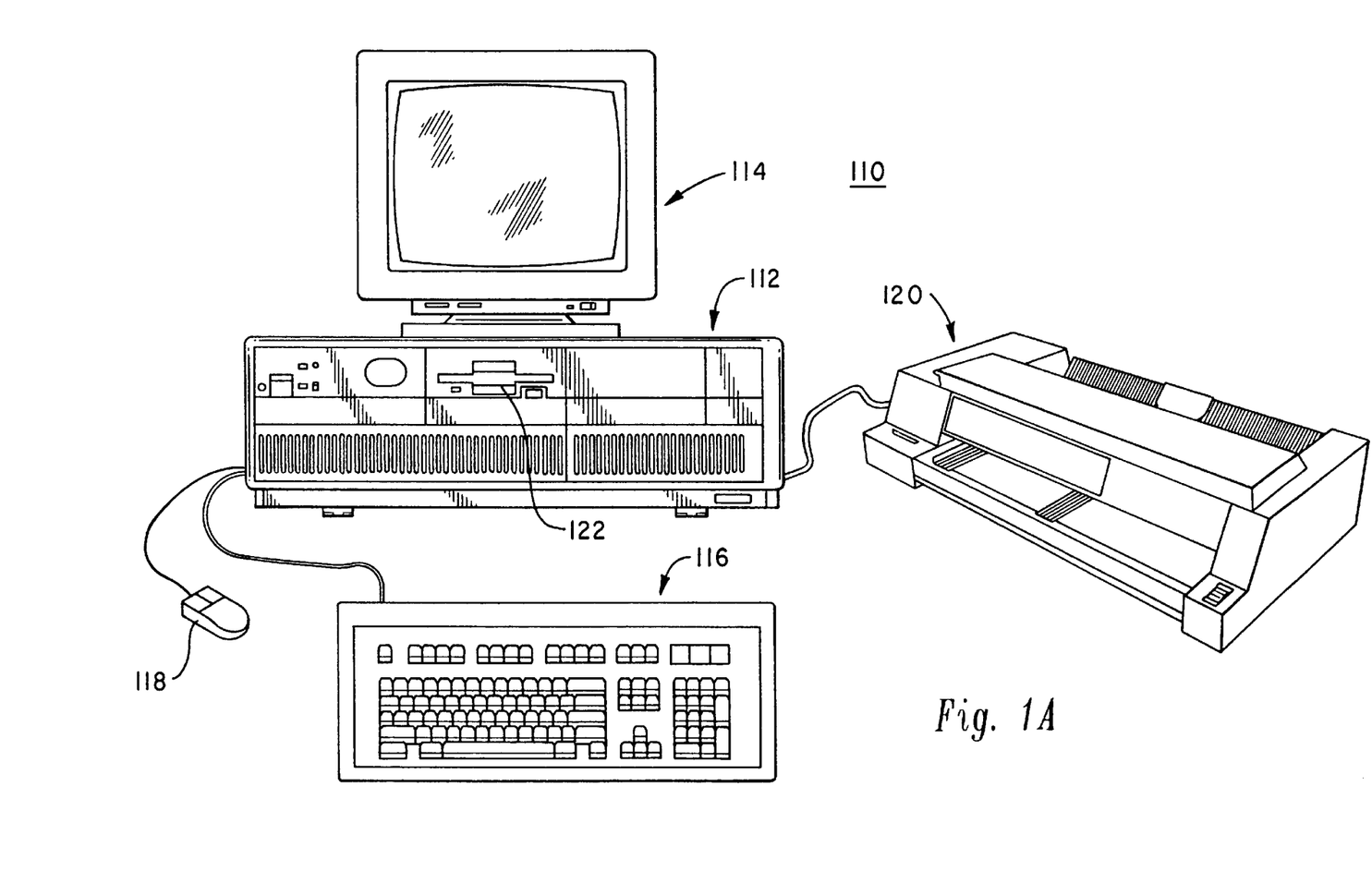
FIG. 1A is a data processing system in which the present invention can be employed.

Referring now to the figures, and in particular to FIG. 1A, a data processing system, personal computer system 110, in which the present invention can be employed is depicted. As shown, personal computer system 110 comprises a number of components, which are interconnected together. More particularly, a system unit 112 is coupled to and can drive an optional monitor 114 (such as a conventional video display). A system unit 112 also can be optionally coupled to input devices such as a PC keyboard 116 or a mouse 118. An optional output device, such as a printer 120, also can be connected to the system unit 112. Finally, system unit 112 may include one or more mass storage devices such as the diskette drive 122.

As will be described below, the system unit 112 responds to input devices, such as PC keyboard 116, the mouse 118, or local area networking interfaces. Additionally, input/output (I/O) devices, such as floppy diskette drive 122, display 114, printer 120, and local area network communication system are connected to system unit 112 in a manner well known. Of course, those skilled in the art are aware that other conventional components also can be connected to the system unit 112 for interaction therewith. In accordance with the present invention, personal computer system 110 includes a system processor that is interconnected to a random access memory (RAM), a read only memory (ROM), and a plurality of I/O devices.

In normal use, personal computer system 110 can be designed to give independent computing power to a small group of users as a server or a single user and is inexpensively priced for purchase by individuals or small businesses. In operation, the system processor functions under an operating system, such as IBM's OS/2 operating system, Apple Computer Corporation's Mac OS or DOS. OS/2 is a registered trademark of International Business Machines Corporation. "Mac OS" is a registered trademark of Apple Computer Corporation.

Figure 1B:
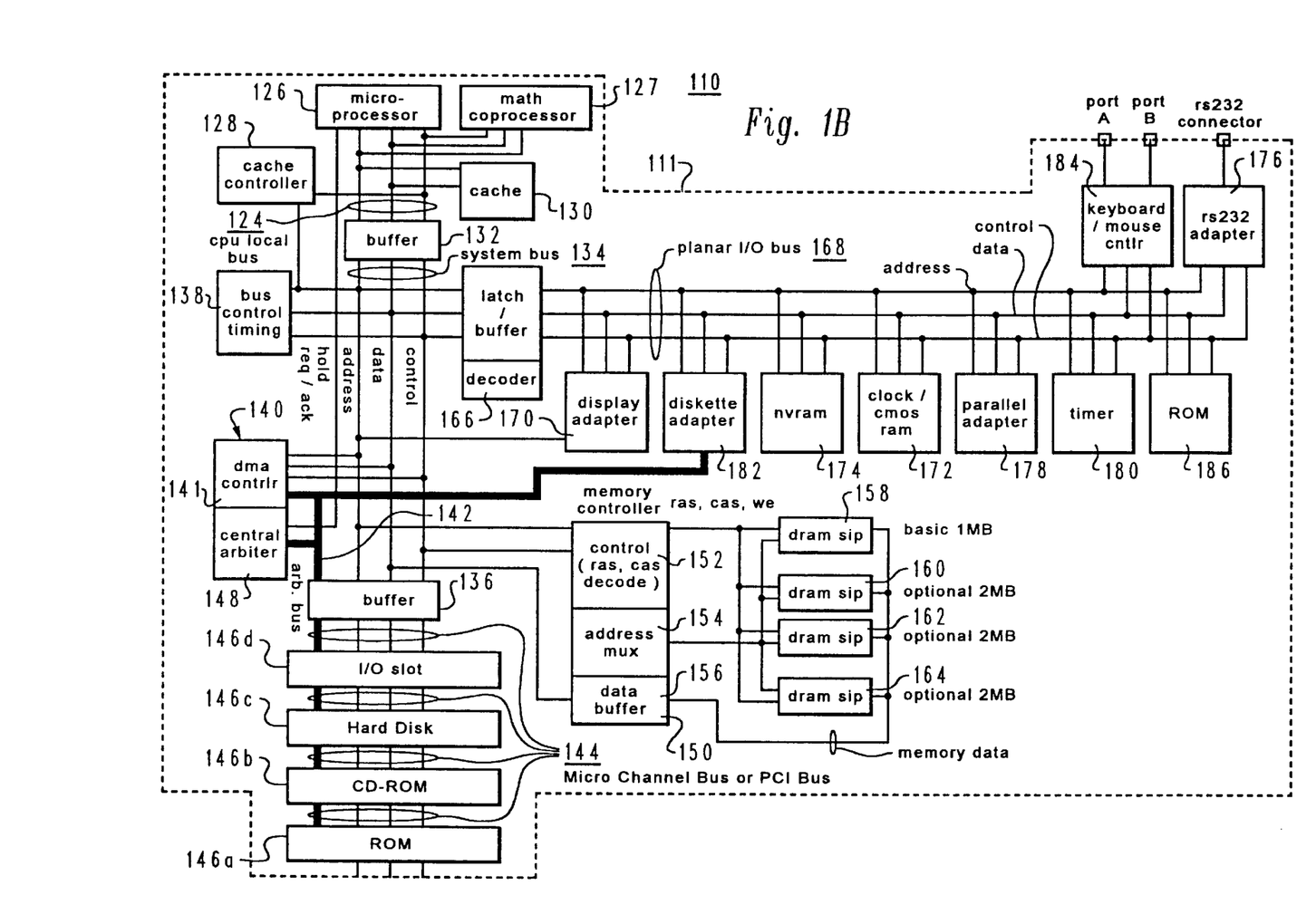
FIG. 1B is a block diagram illustrating the various components in accordance with the present invention.

Prior to relating the above structure to the present invention, a summary of the operation in general of personal computer system 110 may merit review. Referring to FIG. 1B, there is shown a block diagram of personal computer system 110 illustrating the various components of personal computer system 110 in accordance with the present invention. FIG. 1B further illustrates components of motherboard 111 and the connection of motherboard 111 to I/O slots 146a–146d and other hardware of personal computer system 110. Connected to motherboard 111 is the system central processing unit (CPU) 126 comprised of a microprocessor which is connected by a high speed CPU local bus 124 through a bus controlled timing unit 138 to a memory control unit 150 which is further connected to a volatile random access memory (RAM) 158.

While the present invention is described hereinafter with particular reference to the system block diagram of FIG. 1B, it is to be understood at the outset of the description which follows, it is contemplated that the apparatus and methods in accordance with the present invention may be used with other hardware configurations of the motherboard. For example, the system processor could be an Intel, IBM, or Motorola microprocessor. These particular microprocessors can operate in a real addressing mode or a protected addressing mode. Each mode provides an addressing scheme for accessing different areas of the microprocessor's memory.

Returning now to FIG. 1B, CPU local bus 124 (comprising data, address and control components) provides for the connection of CPU 126, an optional math coprocessor 127, a cache controller 128, and a cache memory 130. Also coupled on CPU local bus 124 is a buffer 132. Buffer 132 is itself connected to a slower speed (compared to the CPU local bus) system bus 134, also comprising address, data and control components. System bus 134 extends between buffer 132 and a further buffer 136. System bus 134 is further connected to a bus control and timing unit 138 and a Direct Memory Access (DMA) unit 140. DMA unit 140 is comprised of a central arbitration unit 148 and a DMA controller 141. Buffer 136 provides an interface between the system bus 134 and an optional feature bus such as the Micro Channel bus 144, SCSI bus, NuBus, or PCI bus. "Micro Channel" is a registered trademark of International Business Machines Corporation. "NuBus" is a registered trademark of Apple Computer Corporation. Connected to bus 144 are a plurality of I/O slots 146a–146d for receiving adapter cards which may be further connected to an I/O device or memory. In the depicted example, I/O slot 146a has a hard disk drive connected to it; I/O slot 146b has a CD-ROM drive connected to it; and I/O slot 146c has a ROM on an adapter card connected to it. Other devices, such as a modem may be connected to an I/O slot. An arbitration control bus 142 couples the DMA controller 141 and central arbitration unit 148 to I/O slots 146 and diskette adapter 182. Also connected to system bus 134 is a memory control unit 150 which is comprised of a memory controller 152, an address multiplexer 154, and a data buffer 156. Memory control unit 150 is further connected to a random access memory as represented by RAM module 158. Memory controller 152 includes the logic for mapping addresses to and from CPU 126 to particular areas of RAM 158. While the personal computer system 110 is shown with a basic 4 megabyte RAM module, it is understood that additional memory can be interconnected as represented in FIG. 1B by the optional memory modules 160 through 164.

A further buffer 166 is coupled between system bus 134 and a motherboard I/O bus 168. Motherboard I/O bus 168 includes address, data, and control components respectively. Coupled along motherboard bus 168 are a variety of I/O adapters and other peripheral components such as display adapter 170 (which is used to drive an optional display 114), a clock 172, nonvolatile RAM 174 (hereinafter referred to as "NVRAM"), a RS232 adapter 176, a parallel adapter 178, a plurality of timers 180, a diskette adapter 182, a PC keyboard/mouse controller 184, and a read only memory (ROM) 186. The ROM 186 includes Basic Input/Output System which provides the user transparent communications between many I/O devices.

Clock 172 is used for time of day calculations. NVRAM 174 is used to store system configuration data. That is, the NVRAM will contain values which describe the present configuration of the system. For example, NVRAM 174 contains information which describe the capacity of a fixed disk or diskette, the type of display, the amount of memory, etc. Of particular importance, NVRAM 174 will contain data which is used to describe the system console configuration; i.e., whether a PC keyboard is connected to the keyboard/mouse controller 184, a display controller is available or the ASCII terminal is connected to RS232 adapter 176. Furthermore, these data are stored in NVRAM 174 whenever a special configuration program is executed. The purpose of the configuration program is to store values characterizing the configuration of this system to NVRAM 176 which are saved when power is removed from the system.

Connected to keyboard/mouse controller 184 are ports A and B. These ports are used to connect a PC keyboard (as opposed to an ASCII terminal) and mouse to the PC system. Coupled to RS232 adapter unit 176 is an RS232 connector. An optional ASCII terminal can be coupled to the system through this connector.

Specifically, personal computer system 110 may be implemented utilizing any suitable computer such as the IBM personal computer, Apple Macintosh computer, or Sun workstation, to name a few. These various work stations may include a capability of multiprocessing or multithreading. "Multiprocessing" is a mode of operation in which two or more connected and roughly equal processing units each carry out one or more processes (programs or sets of instructions) in tandem. In multiprocessing, each processing unit works on a different set of instructions or on different parts of the same process. Such a configuration is employed to increase speed or computing power as with parallel processing or the use of special units called coprocessors. The term "multithreading" is defined as the running of several processes in rapid sequence (multitasking) within a single program. Multitasking may be accomplished in a number of different ways and to those skilled in the art, i.e., cooperative multitasking and time-slice multitasking.

Figure 2:
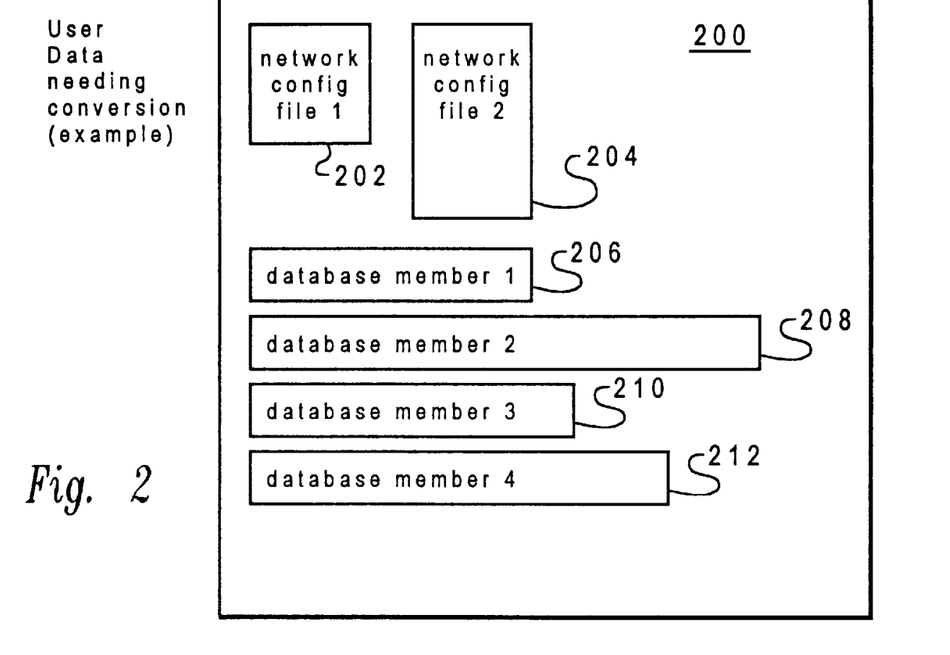
FIG. 2 is a diagram illustrating various data structures that may require conversion in a data processing system is depicted in accordance with a preferred embodiment of the present invention.

With reference now to FIG. 2, a diagram illustrating various data structures that may require conversion in a data processing system is depicted in accordance with a preferred embodiment of the present invention. Storage device 200 contains a number of data structures that may require conversion during installation of software to the data processing system. Storage device 200 contains data structures such as, network configuration files 202 and 204. These network configuration files are created on the system and contain various parameters and statements for configuring the data processing system for use with a network. Installation of new software or updates of software often may require alteration of these files. In such a situation, the files must be converted to include additional information or to delete old and unneeded information from these files. Storage device 200 also includes data structures such as, database members 206–212. These database members often require conversions when a new version of a software package is installed that manipulates data in a new format. The data structures in storage device 200 are depicted as examples of different types of data structures that may require conversion when software is installed on the data processing system.

Figure 3A:
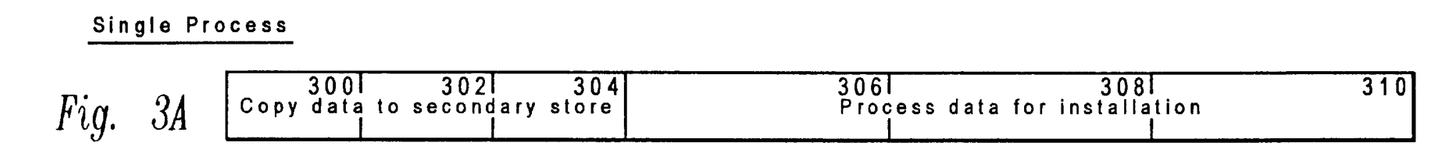
FIGS. 3A–3D are diagrams illustrating how installation times for software can be effected by multithreading and/or multiprocessing in accordance with a preferred embodiment of the present invention.

Referring now to FIGS. 3A to 3D, diagrams illustrating how installation times for software can be effected by multithreading and/or multiprocessing are depicted in accordance with a preferred embodiment of the present invention. Time for installing software in a single process data processing system is depicted in FIG. 3A. Under a single process system, all of the data to be installed may be copied to a secondary storage site, such as a hard disk drive, from a source, such as a diskette or from a tape. In FIG. 3A, copy segments 300–304 are performed to copy data to the secondary storage site prior to processing the data for installation on the data processing system. As can be seen, process segments 306–310 are performed after the data is copied to the secondary storage site.

Figure 3B:
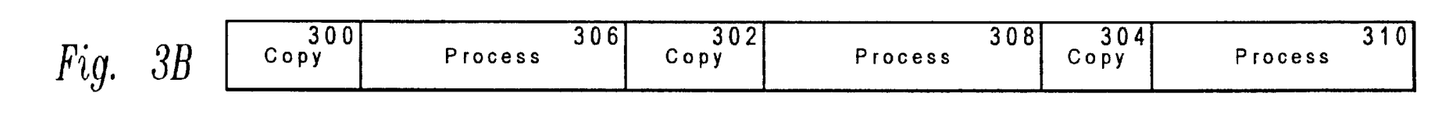

Process segment 306 processes data copied during copy segment 300, process segment 308 processes data copied during copy segment 302, and process segment 310 processes data copied during copy segment 304. In FIG. 3B, installation time on a single process system is depicted in which copying of data and processing of data alternated. As can be seen in FIG. 3B, copy segment 300 is performed prior to processing segment 306 in which data is copied to a secondary storage site during copy segment 300 and then processed during process segment 306. This alternating copying of data and processing of data can be seen with respect to the rest of FIG. 3B. In either case, the installation time is the same on a single process data processing system. FIG. 3A and 3B illustrate installation using "linear" processing in which the ability to process several items at the same time is absent. In data processing systems that employ non-linear processing, the ability to process several items, perform several functions, or execute several instructions at the same time, such as in data processing systems that have a capability for multiprocessing, multithreading or parallel processing.

Figures 3C, 3D:
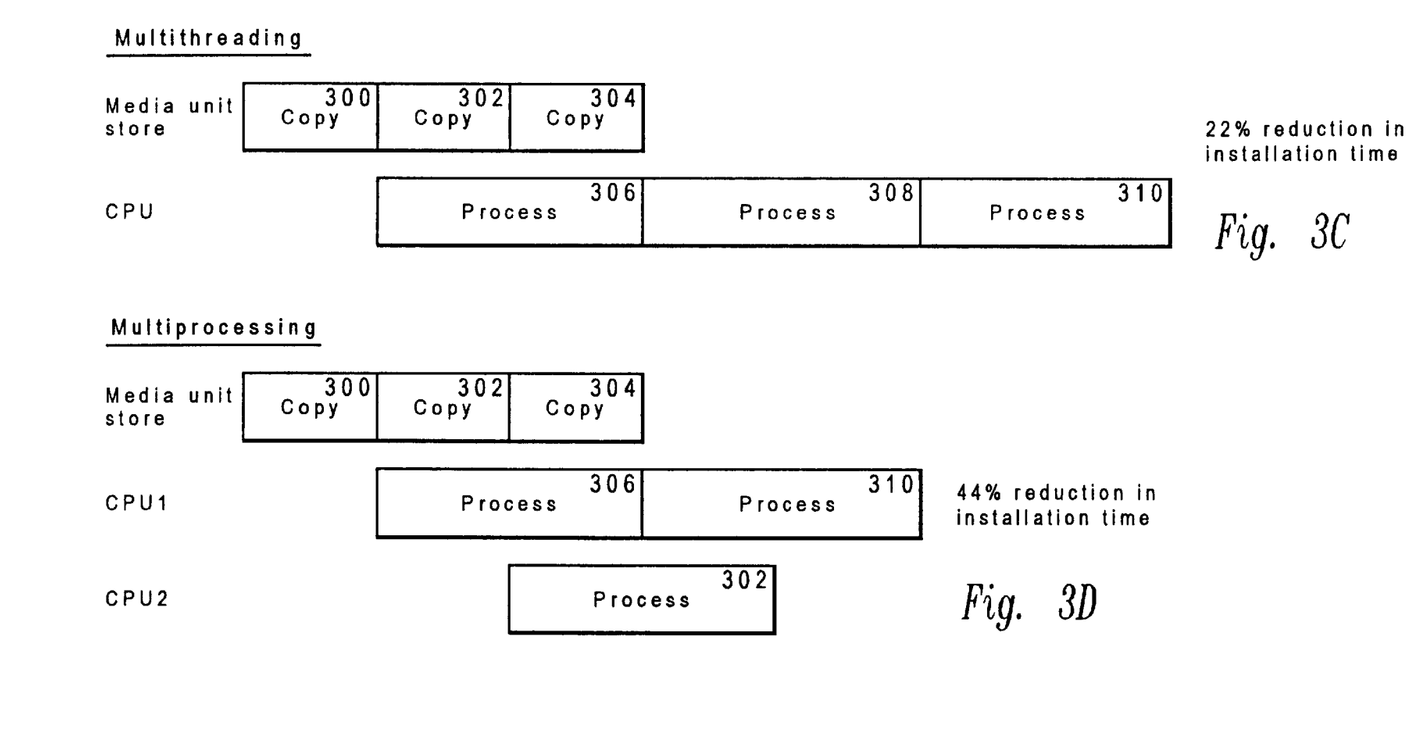

Turning now to FIG. 3C, installation time is depicted for a multithreaded data processing system in accordance with a preferred embodiment of the present invention. In this diagram, data is copied from the source or media unit, i.e., a magnetic tape or a CD ROM in copy segments 300–304. The data is processed during process segments 306–310. As can be seen with reference to FIG. 3C, process segment 306 begins after copy segment 300 is completed. Process segment 306 occurs at the same time copy segments 302 and 304 occur in the data processing system. As can be seen in FIG. 3C, this multithreaded data processing system reduces installation time because of the multithreading or time slicing that occurs in coping and processing the copied data.

With reference now to FIG. 3D, a diagram of installation time for a multiprocessing data processing system is depicted in accordance with a preferred embodiment of the present invention. As with the installation on a multithreaded system depicted in FIG. 3C, copy segment 300 occurs first with process segment 306 being performed after copy segment 300 has been completed. Again, copy segments 302 and 304 occur after copy segment 300, but are in parallel with the execution of process segment 306. In addition, process segment 308 occurs after copy segment 302 has been performed to process data copied during copy segment 302. In the depicted example, a second CPU is employed to execute this process segment. Process segment 310 is executed after copy segment 304 finishes. As a result, additional reduction in installation time occurs in a multiprocessing system when compared to installation of the same software on a single process or multithreaded data processing system.

Figure 4:
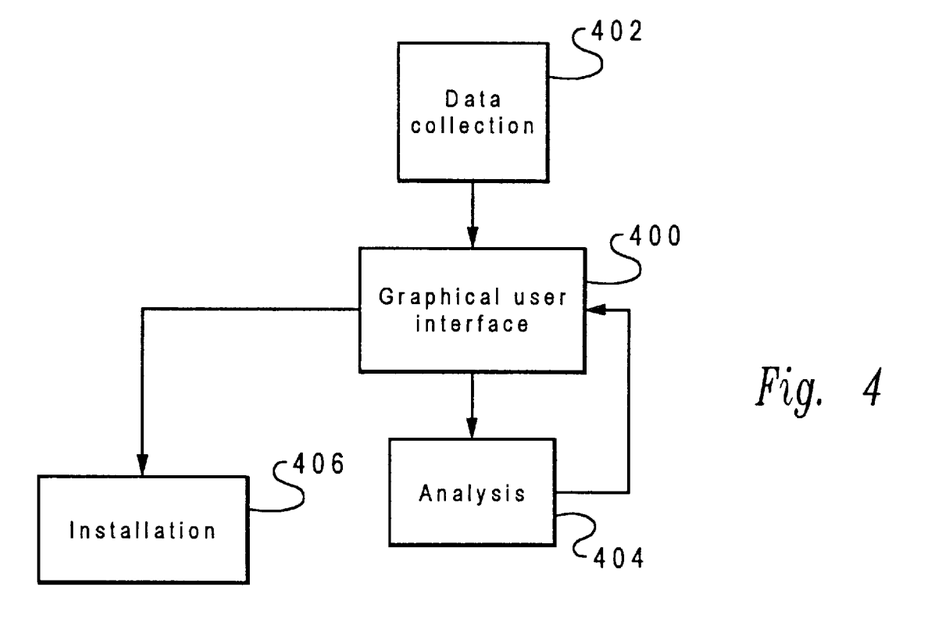
FIG. 4 is a block diagram of software components for installation time estimation in accordance with a preferred embodiment of the present invention.

With reference now to FIG. 4, a block diagram of software components for installation time estimation is depicted in accordance with a preferred embodiment of the present invention. Graphical user interface 400 is a graphic user interface displayed within a data processing system such as that depicted in FIGS. 1A and 1B. Graphical user interface 400 receives user input as to what options are to be installed. Options are, for example, programs, such as base programs for software, tutorial programs, help programs, and programs for supporting various features that may be selected for use. Graphical user interface 400 also provides information to a user as to the time needed to complete installation of selected options. Data collection block 402 is employed to collect data from the data processing system for use in estimating the time needed to install options selected by a user. Analysis block 404 is employed for actually performing the necessary calculations to determine the estimated time for installing options selected by a user. When analysis block 404 has completed estimation of a time for installing selected objects, this data is sent back to graphical user interface 400 for display to the user. When the user is satisfied with the options selected and the estimated time for installing selected objects, installation block 406 begins installing the selected options in response to input by the user at graphical user interface 400. Graphical user interface 400 and data collection block 402 may be implemented in a number of ways known to those skilled in the art.

During data collection, data collection block 402, may determine what data is to be converted by querying the data processing system to find all files of the type to be converted. The size of each file or any other information needed to estimate conversion time also is collected. Data collection block 402 may collect data on the data processing system configuration by finding hardware model numbers and using a table within the installation program to find performance characteristics, such as speed, size, etc., of each component to present. Alternatively, data processing system configuration information may be gathered by data collection block 402 through polling various components within the data processing system to obtain configuration information. More details as to the various displays provided by graphical user interface 400 and the processes followed by analysis block 404 are described below.

Figure 5A:
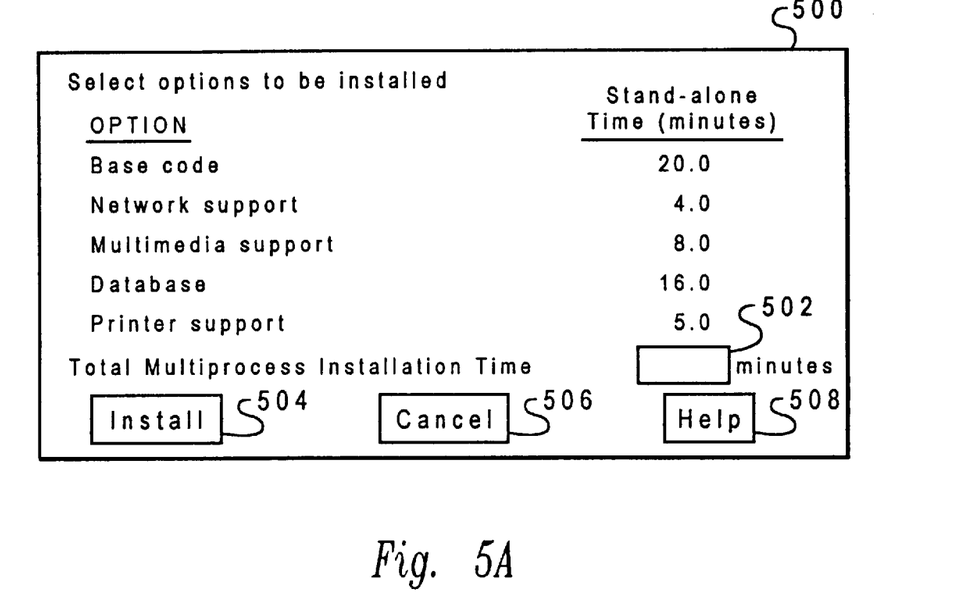
FIGS. 5A–5C are pictorial illustrations of screens displayed to a user for installing software are depicted in accordance with a preferred embodiment of the present invention.
Figure 5B:
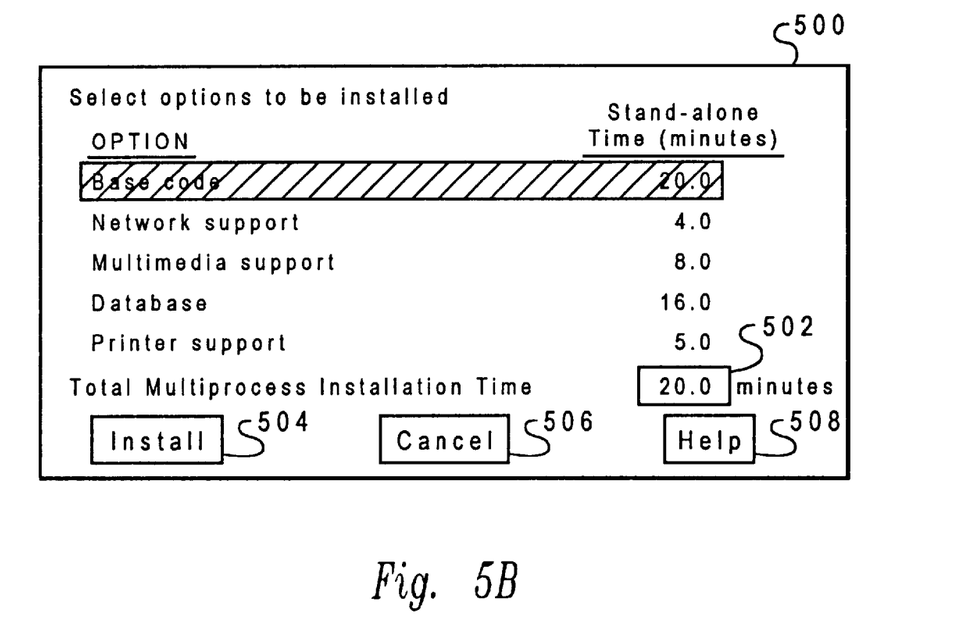
Figure 5C:
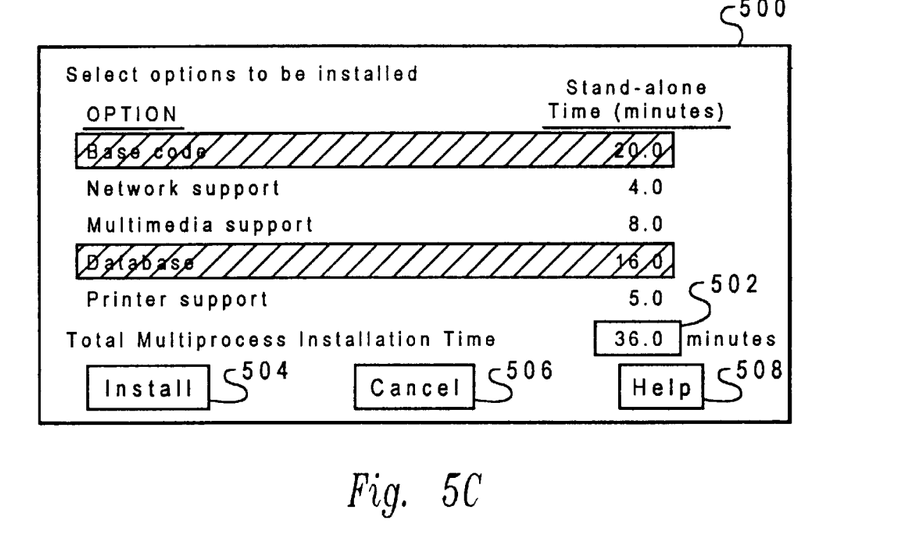

With reference now to FIGS. 5A–5C, pictorial illustrations of screens displayed to a user for installing software are depicted in accordance with a preferred embodiment of the present invention. In FIG. 5A, display screen 500 illustrates options displayed to a user for installing software. In the depicted example, the various options that may be installed include base code, network support, multimedia support, data base, and printer support. Display screen 500 depicts the time needed to install the various options in the form of a stand-alone time in minutes. Stand-alone time indicates the time needed to install a single option using only one thread in a data processing system. Multithreading and multiprocessing are not included in this calculation. Field 502 depicts the total multiprocessing installation time in minutes. Although the "multiprocessing" installation time is depicted, field 502 may depict total processing time for multithreading alone or for both multithreading and multiprocessing or any other non-linear processing time. In other words, field 502 depicts the estimated installation time taking into account the options selected and the configuration of the data processing system. No time is shown in field 502 because no options have been selected by the user. After selecting options that the user desires to have installed, the user may install the options by selecting button 504, cancel the selections by selecting button 506, or request help by selecting button 508.

Figure 6A:
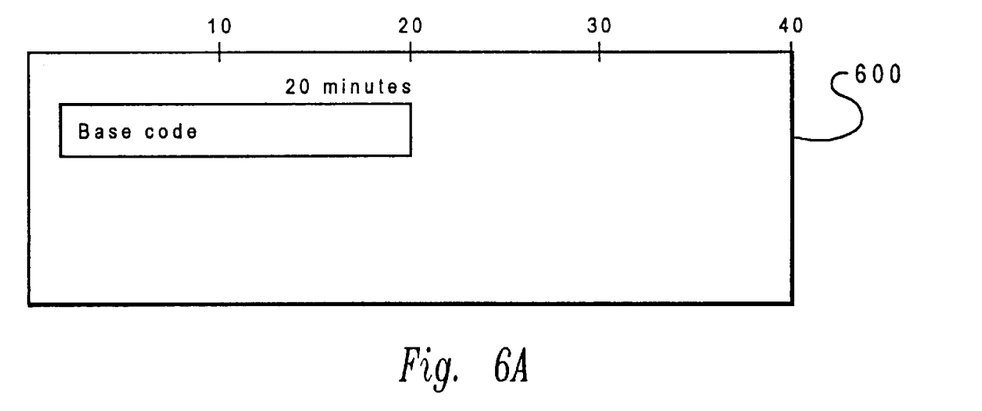
FIG. 6A depicts the time needed to install the base code selected in FIG. 5B.

With reference now to FIG. 5B, screen 500 depicts that base code has been selected as an option for installation. Field 502 shows that the installation time is 22 minutes. Chart 600 in FIG. 6A depicts the time needed to install the base code selected in FIG. 5B.

Figure 6B:
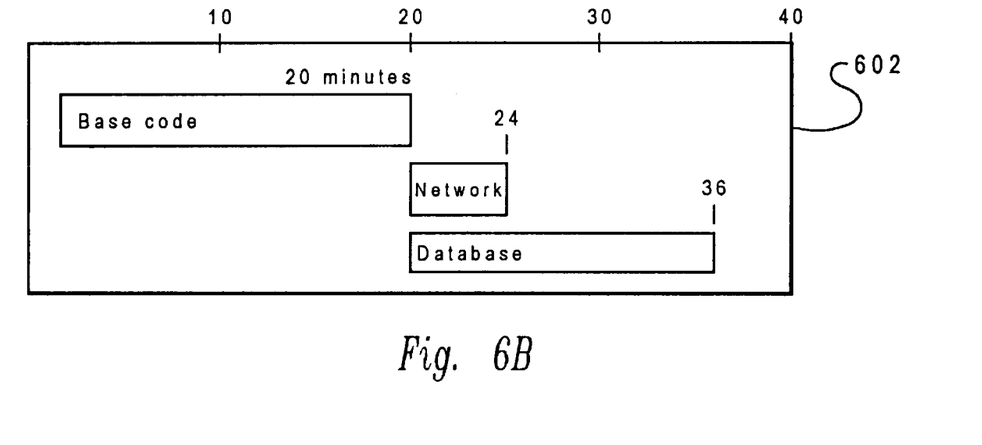
FIG. 6B shows how selected options are processed within a multiprocessing system.

Referring now to FIG. 5C, in addition to the base code, network support and data base has been selected for installation. Field 502 shows that 36 minutes are required to install these three options. As can be seen, the time shown in field 502 is less than that of the stand-alone times added together for these three options. Chart 602 in FIG. 6B shows how these options are processed within a multiprocessing system. As can been seen, the multiprocessing system allows simultaneous installation of various components, thus reducing the total amount of time needed to install these options when compared to the stand-alone times for the same options.

Figure 7:
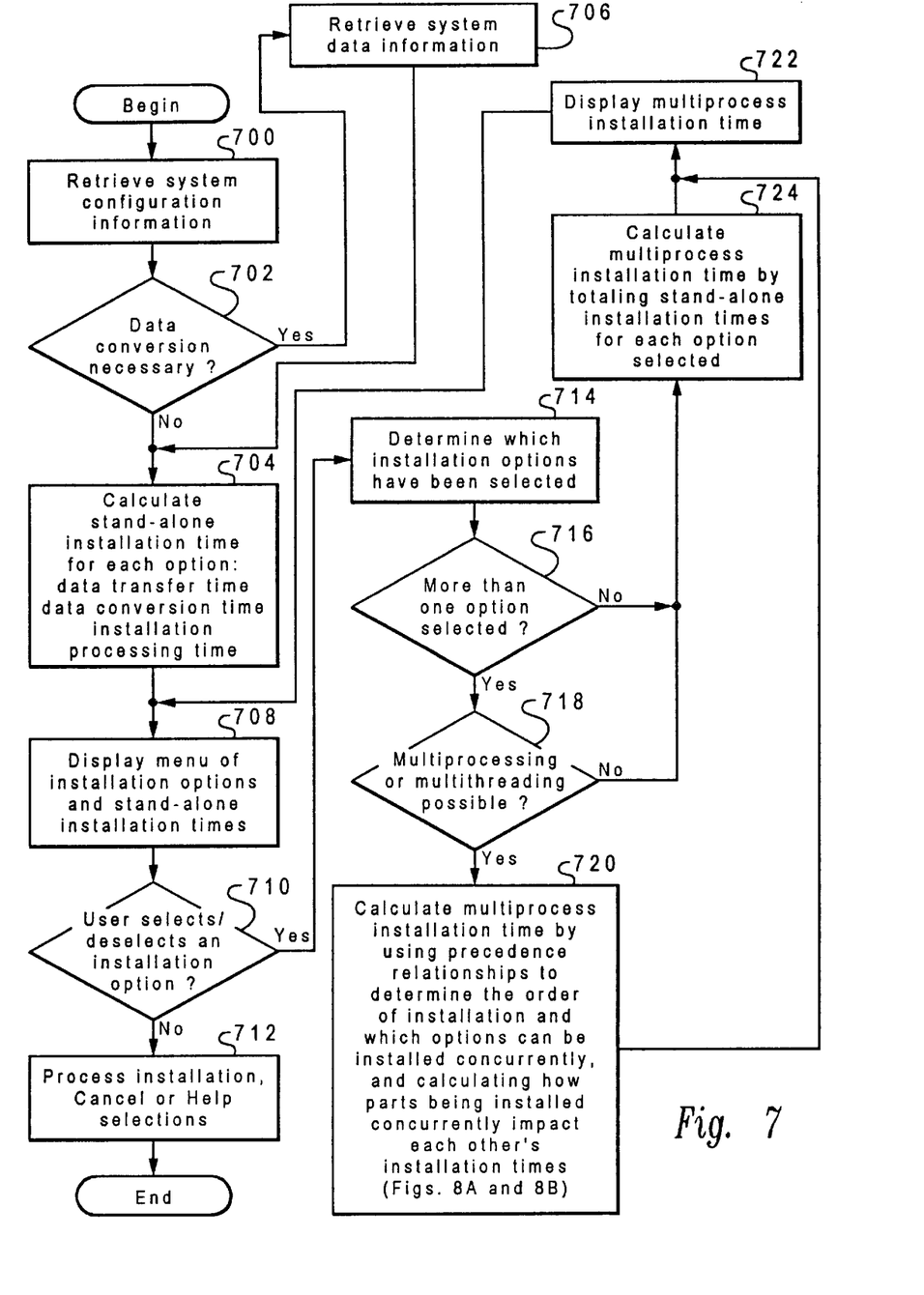
FIG. 7 is a flowchart of a process for estimating installation time for software in a data processing system in accordance with a preferred embodiment of the present invention.

With reference now to FIG. 7, a flowchart of a process for estimating installation time for software in a data processing system is depicted in accordance with a preferred embodiment of the present invention. The process begins by retrieving system configuration information (step 700). Configuration information contains data as to the configuration of the data processing system. This information includes the sum of a data processing system's internal and external components, including memory, disk drives, processors, modems, or printers.

In addition, data collection block 402 also obtains information from the installation program regarding the installation of the software. This information is employed to predict installation times for software in the data processing system. The information comes from the data processing system or the installation program. TABLE 1 is a nonexhaustive list of information that may be retrieved from the data processing system and used to predict installation times.

TABLE 1

DATA PROCESSING SYSTEM INFORMATION.

CPU Speed(s)
Number of CPUs
Disk unit speed(s)
Number of disk units
Speed of install device
Speed of main memory
Number of files and/or records needing conversion
Size of files and/or records needing conversion
Speed of bus(es)
Capacity of bus(es)
Size of cache(s)
Size of main memory
Devices to be configured
Network information Information used to predict installation times also may originate from the installation program. TABLE 2 below illustrates a nonexhaustive list of information that may be retrieved from the installation program.

TABLE 2

INSTALLATION PROGRAM INFORMATION

+ Priority of installation options
+ Concurrency relationships between installation options
+ Precedence relationships between installation options
+ Amount of data to be transferred from install device to data processing system
+ Number of instructions required to convert each type of file and/or records
+ Number of instructions required to install decompress, etc. each file and/or record being transferred After retrieving system configuration information, the process determines whether conversion of existing data is necessary (step 702). If data conversion is necessary, the process determines the number and size of files and/or records to be converted (step 706). The following is pseudo code for determining the number and size of files or records to be converted:

for each file and/or record type that needs converting
    query system for the number of files and/or records of this type
for each file and/or record of this type
    query the system for the size of the file and/or record The process then calculates stand-alone installation time for each option taking into account data transfer time, data conversion time (if any), and installation processing time (step 704). Data transfer time, data conversion time, and installation processing time, aslo called "installatin time", are described in more detail in the description of FIG. 9 below.

Next, the process displays a menu of installation options and stand-alone installation times for each of the options (step 708). Thereafter, the process determines whether an option has been selected or deselected (step 710). If an option has not been selected or deselected, the process then proceeds to either install the options selected, cancel the installation process, or provide help in response to a user input (step 712) with the process terminating thereafter.

Referring again to step 710, if the user has selected or deselected an installation option, the process then determines what options have been selected to be installed (step 714). The process then determines whether more than one option has been selected to be installed (step 716). If more than one option has been selected, the process then determines whether multiprocessing or multithreading can be employed in the data processing system (step 718). If multiprocessing or multithreading can be used, the process then calculates installation time by (1) using precedence relationships and priorities to determine the order of installation, (2) using concurrency relationships to determining which options can be installed at the same time, and (3) calculating how parts being installed concurrently impact each other's installation times (step 720) as described in FIG. 8A and 8B. The process then displays the installation time (step 722) with the process then returning to (step 708) as described above.

Referring again to step 718, if multiprocessing or multithreading is not possible, the process then calculates the installation time by totaling the stand-alone installation time for each option that has been selected to be installed (step 724). Thereafter, the process displays the installation time to the user (step 722). With reference again to step 716, if only one option is selected, the process then proceeds to step 724 as described above.

Figure 8A:
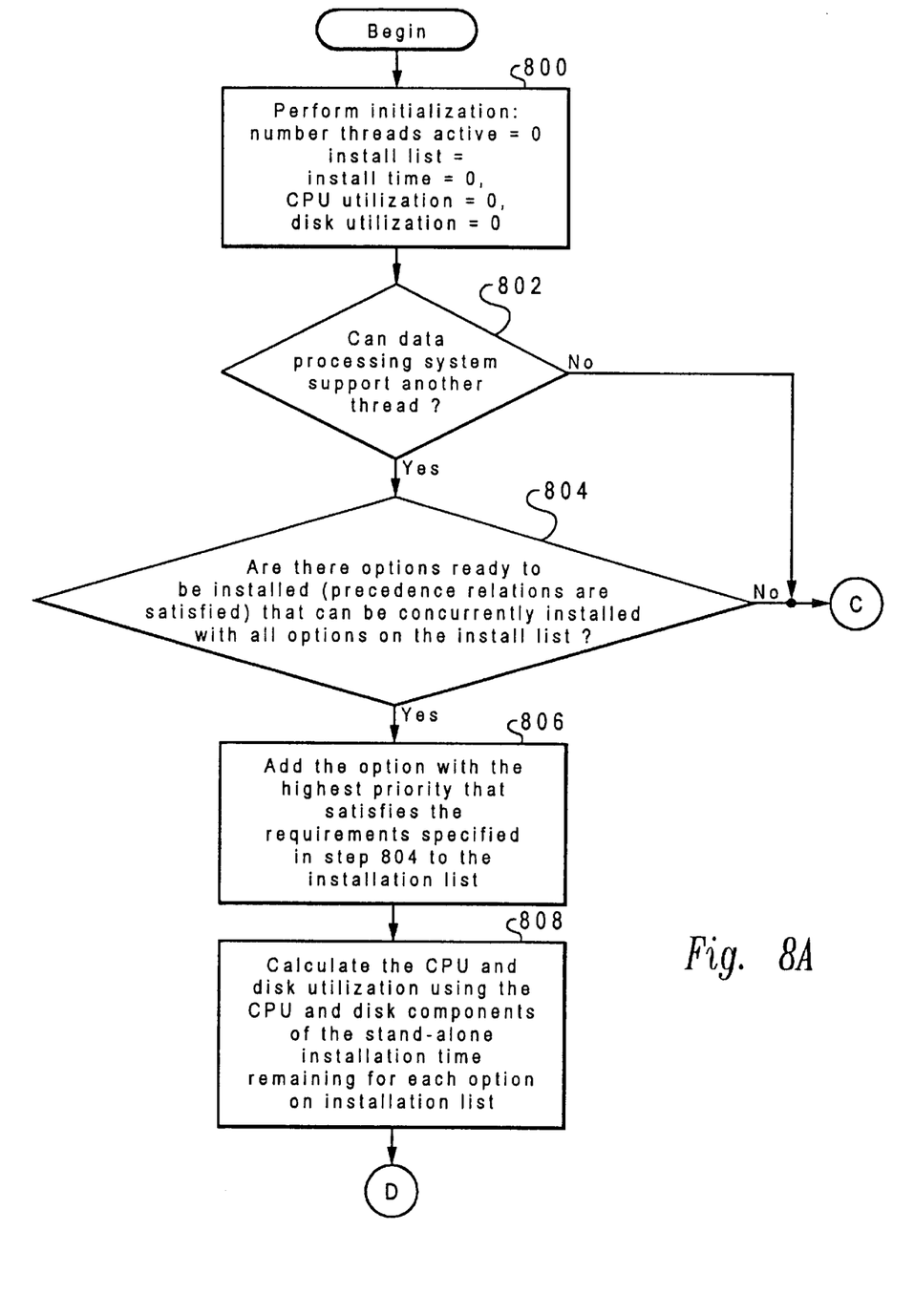
FIGS. 8A and 8B are a flowchart of a process for calculating multiprocess installation time in accordance with a preferred embodiment of the present invention.
Figure 8B:
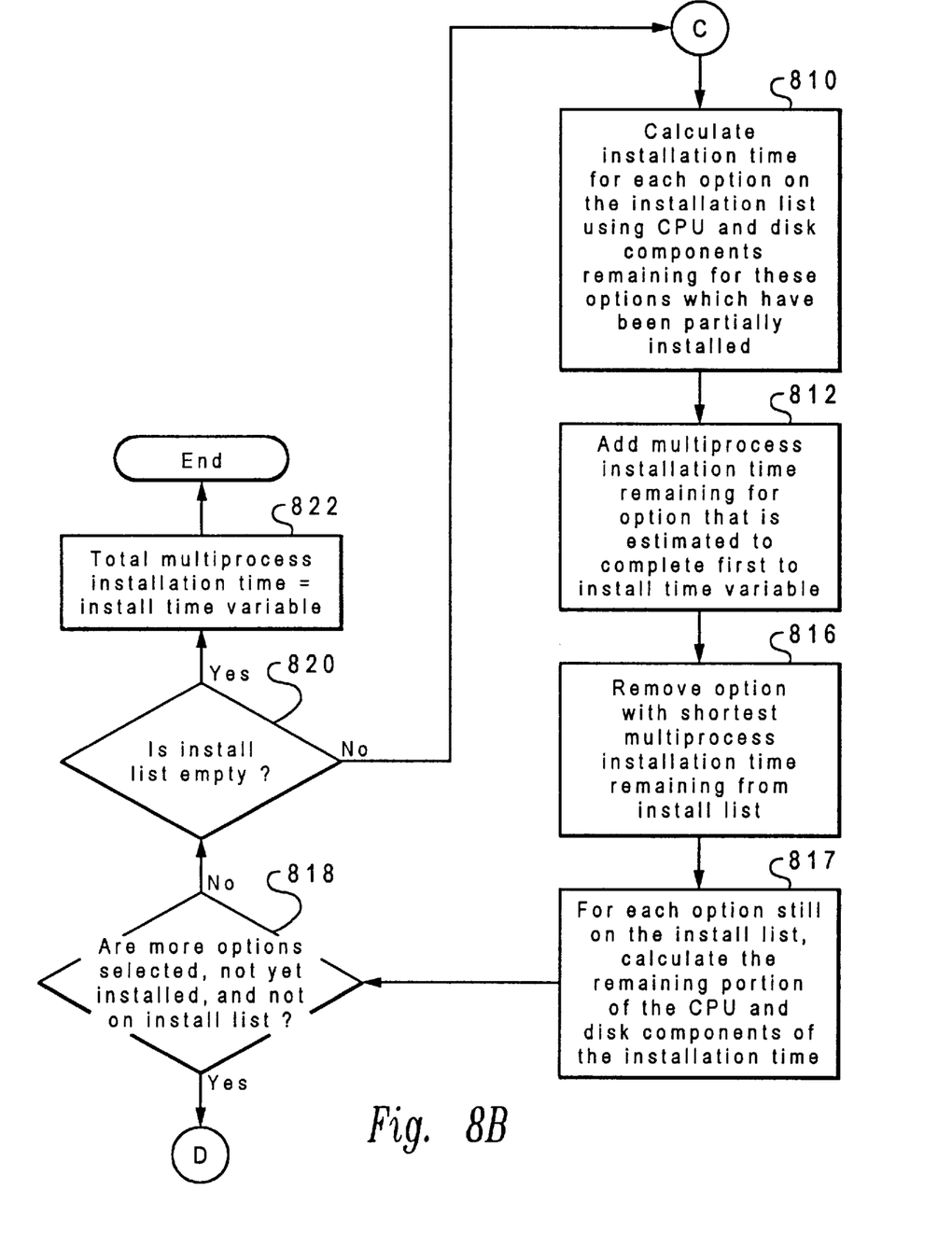

With reference now to FIGS. 8A and 8B, a flowchart of a process for calculating multiprocessing installation time in accordance with a preferred embodiment of the present invention. FIGS. 8A and 8B depict a more detailed description of the process in block 720 in FIG. 7.

The process begins by performing initialization by setting the number of threads active equal to 0, setting the installation list equal to null, setting the installation time equal to 0, setting the CPU utilization equal to 0, and setting the disk utilization equal to 0 (step 800). Thereafter, the process determines whether the data processing system can support another thread (step 802). In making this determination, the process determines whether the CPU utilization is less than some maximum amount allowed and whether the disk utilization is less than some maximum amount allowed for the data processing system. If the data processing system can support another thread (i.e. the CPU and disk utilizations are below the maximum amounts allowed), the process then determines whether another option is ready to be installed that can be concurrently installed with all the options on the installation list (step 804). In other words, the process determines whether the precedence relationships for the option are satisfied and that the option has no concurrence relationships with any of the options currently on the installation list.

Precedence relations ensure a certain ordering of events. For example, base operating system code changes must be installed before database base code can be installed because the latter option uses updated operating system code during its installation. Also, help files and example files for the database options must be installed after the base database option because they are installed into directories created during the installation of the database base code option.

In the example above, the precedence relations are: base operating system code must be installed before database support base code. Database support base code must be installed before database help files. Database support base code must be installed before database example files.

Concurrence relations ensure that certain options are not concurrently installed. This restriction is usually placed on options that modify some common data area on the data processing system. An example might be that the network support help files cannot be installed at the same time that the database support help files are installed because they are both inserting records into the same message file. If they were allowed to be installed concurrently, they would keep locking each other out of the file and waste processing time that could be better used to install other options.

Precedence and concurrence relationships can be implemented in a variety of ways. For example, each install option could be stored as a data structure in a linked list that itself had a linked list for precedence relations and one for concurrence relations. Each installation option data structure could have an instal flag, a done flag, and an assigned priority value. When the installation process determines that the data processing system can support another thread, it searches through the linked list of installation options looking for ones that have been selected by the user to be installed (install flag=true), and has not already been installed (done flag=false). Starting with the installation option with the highest priority, the process steps through each entry on the installation option's precedence list and checks if the entry has already been installed. If all of the entries on the precedence list have already been installed, the installation option is ready to be installed. But before it can be installed, the process must check if any of the entries on its concurrency list match any of the options on the installation list. If there is a match, then this option cannot be installed at this time and the process must check to see if the installation option of the next highest priority can be installed.

The process then proceeds to add the option with the highest priority that satisfies the requirement specified in step 804 to the installation list (step 806). The installation list contains installation options that are currently being installed. For example, when the multiprocess installation time estimation process begins, the installation list is empty because no options are currently being installed. Using the example shown in FIGS. 5A–5C and 6A–6B, the base operating support code option is immediately added to the installation list. Because of its precedence relationships with the other options selected, it can only be installed by itself. When it completes, it is removed from the installation list and the precedence relationships between the network support and database support options are satisfied. They are both eligible to be added to the list and in this example the CPU and disk utilizations are low enough that both of them can be (one at a time following the flowchart in FIG. 8A). As the network support option completes, it is removed from the install list. No other options have been selected to be installed, so the database option continues installing alone until it completes. An example of how items are added and removed from an installation list is depicted in TABLE 3 below.

TABLE 3

| | |
|---|---|
| Time = 0 | install list = NULL |
| Time = 0 | Base Code installation begins, add to install list |
| Time = 0–20 | install list = Base Code |
| Time = 20 | Base Code completes, remove from install list |
| time = 20 | Network Support installation begins, add to install list |
| Time = 20 | Database Support installation begins, add to install list |
| Time = 20–24 | install list = Network Support, Database Support |
| Time = 24 | Network Support completes, remove from install list |
| Time = 24–36 | install list = Database support |
| Time = 36 | Database Support completes, remove from install list |
| Time = 36 | install list = NULL, instaliation process complete |

The process then calculates the CPU and disk utilizations using the CPU and disk components of the stand-alone installation time remaining for each option on the installation list (step 808). Thereafter, the process returns to step 802 as described above.

With reference again to steps 802 and 804, if the data processing system cannot support another thread or if there are no options ready to be installed that can be concurrently installed with all the options in the installation list, the process then calculates the installation time remaining for each option on the installation list (step 810). These calculations are made using queuing theory references such as found in "Quantilative System Performance", by Lazowska, Zahorjan, Graham, and Sevcik (1984). The process then adds the multiprocess installation time remaining for the option that is estimated to complete first to the installation time variable (step 812). The installation time variable can be a real number or an integer depending on the accuracy of the installation time estimate desired. During the estimation process it records how long the installation is estimated to take. This value changes (always increasing) depending on where the estimation process is at that time. TABLE 4 depicts changes in the installation time variable for various times during an installation estimation. This table is based on TABLE 3.

TABLE 4

| | |
|---|---|
| Time = 0 | install time variable = 0 |
| Time = 20 | Base Code completes, installation time variable = 20 |
| Time = 24 | Network Support completes, installation time variable = 24 |
| Time = 36 | Database Support completes, installation time variable = 36 |
| Time = 36 | total installation time = 36, installation process complete |

Next, the process removes the option with the shortest multiprocessing installation time remaining from the installation list (step 816). For each option still on the installation list, the percentage of the installation which would have completed during this time is calculated. This percentage is subtracted from the CPU and disk components of the stand-alone installation time for each option (step 817). In all future calculations involving these options, references to the CPU and disk components of the stand-alone installation time will refer to only that portion which remains to be completed.

The process then determines whether additional options have been selected that have not been installed and are not on the installation list (step 818). If the determination in step 816 is yes, the process then proceeds to step 808 as described above. Otherwise, the process proceeds to determine whether the installation list is empty. If the installation list is not empty, the process returns to step 810 as described previously. Otherwise, the process then sets the total multiprocess installation time equal to the installation time variable (step 822) with the process terminating thereafter.

Figure 9:
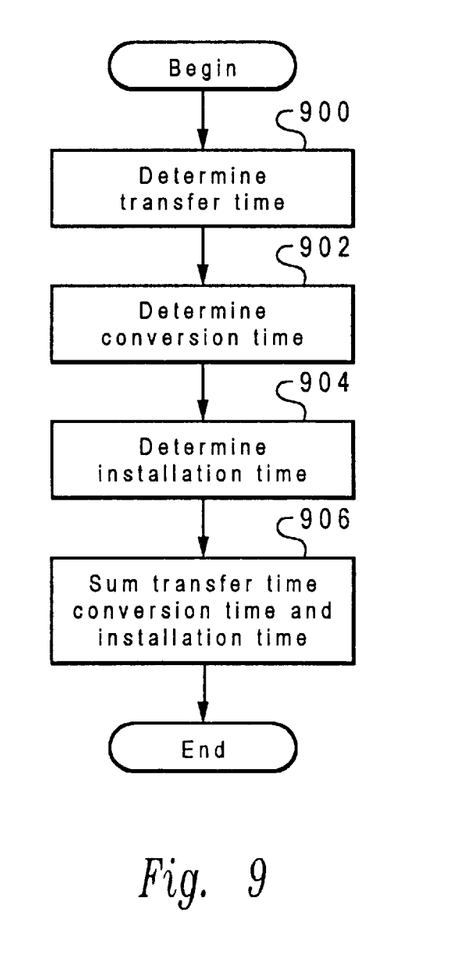
FIG. 9 is a flowchart of a process for estimating stand-alone installation time in accordance with a preferred embodiment of the present invention.

With reference now to FIG. 9, a flowchart of a process for estimating stand-alone installation time is depicted in accordance with a preferred embodiment of the present invention. The process begins by determining transfer time for transferring data from the installation device to the main storage (step 900). This transfer time, t_time, may be calculated as follows:

t_time=speed of install device * amount of data to be read+speed of main memory * amount of data to be read The process then determines the time necessary to convert existing data on the system (step 902). This conversion time, c_time, may be calculated as follows:

c_time=speed of secondary storage device(s) * amount of data to be converted+speed of CPU(s) * instructions required to convert data * amount of data to be converted+speed of secondary storage device(s) * amount of data to be stored The process then determines the installation time needed to install files onto the system (step 904). This installation includes various functions such as decompressing files. The installation time, I_time, may be calculated as follows:

I_time=speed of CPU(s) * instructions required to install data+ speed of secondary storage device(s) * amount of data to be stored The process then determines the total time needed to install the stand-alone time by adding together the transfer time, the conversion time, and the installation time step 906. This process assumes a dedicated system.

The processes of the present invention shown in FIGS. 2–9 may be implemented by those of ordinary skill in the art within the data processing system depicted in FIGS. 1A and 1B. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a ROM, RAM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

Thus, the present invention provides estimation of installation times by taking into account multiprocessing and multithreading data processing systems. In addition, the present invention takes in account the system configuration of the data processing system in which software is being installed. Moreover, the present invention also takes into account any conversion of data existing on the data processing system prior to the software installation. This conversion is taken into account in estimating the time for installing software in a more accurate fashion.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for estimating time required to install software having a plurality of options, the method comprising:

obtaining configuration information about the data processing system;

detecting an ability to perform non-linear processing within the data processing system;

displaying the plurality of options of selection;

in response to a selection of a number of the plurality of options, estimating a time for completing installation of the number of options utilizing the configuration information and the detection of whether an ability to perform non-linear processing is present; and displaying the time for completing installation of the number of options.

2. The method of claim 1 further comprising:

obtaining information about data stored in the data processing system, wherein the data requires conversion.

3. The method of claim 1, further comprising for each displayed option, displaying a time for completing installation of that option in association with a display of the option, wherein the time is a stand-alone time.

4. A storage device readable by a data processing system and encoding data processing system executable instructions for the data storage device comprising:

means for obtaining configuration information about the data processing system;

means for detecting whether an ability to perform non-linear processing within the data processing system is present; and means for estimating a time for completing installation of the software utilizing the configuration information and the detection of whether an ability to perform non-linear processing is present;

wherein the means are activated when the storage device is connected to and accessed by a data processing system.

5. The storage device of claim 3, wherein the storage device is a hard disk drive.

6. The storage device of claim 3, wherein the storage device is a ROM for use in a data processing system.

7. The storage device of claim 3, wherein the storage device is a floppy diskette.

8. The storage device of claim 1, wherein the storage device is a RAM in a data processing system.

9. A method in a data processing system for estimating time required to install software, the method comprising:

obtaining configuration information about the data processing system;

determining whether an ability to perform non-linear processing is present within the data processing system; and estimating a time for completing installation of the software using the configuration information and the determination of whether an ability to perform non-linear processing is present.

10. The method of claim 9, wherein the determining step determines that an ability to perform non-linear processing is present, wherein the non-linear processing is in a form of multiprocessing.

11. The method of claim 9, wherein the determining step determines that an ability to perform non-linear processing is present, wherein the non-linear processing is in a form of multithreading.

12. The method of claim 9, wherein the determining step determines that an ability to perform non-linear processing is present, wherein the non-linear processing is in a form of parallel processing.

13. The method of claim 9, wherein the software being installed includes a plurality of portions and wherein the determining step determines that an ability to perform non-linear processing is present within the data processing system and wherein the step of estimating a time for completing installation includes:

calculating installation time by using precedence relationships between the plurality of portions to determine an order of installation for the plurality of portions and which portions within the plurality of portions can be installed concurrently; and calculating how portions within the plurality of portions being installed concurrently impact installation times of each other.

14. An apparatus for estimating time required to install software comprising:

obtaining means for obtaining configuration information about the data processing system;

determining means for determining whether an ability to perform non-linear processing is present within the data processing system; and estimating means for estimating a time for completing installation of the software using the configuration information and the determination of whether an ability to perform non-linear processing is present.

15. The apparatus of claim 14 wherein the estimating means includes:

first calculation means for calculating installation time by using precedence relationships between the plurality of portions to determine an order of installation and which portions within the plurality of portions can be installed concurrently; and second calculation means for calculating how portions within the plurality of portions being installed concurrently impact installation times of each other.

* * * * *